Sept. 19, 1944.  J. J. SCHOENINGER  2,358,739
LINK
Filed March 19, 1943
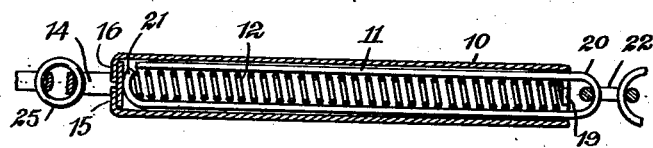
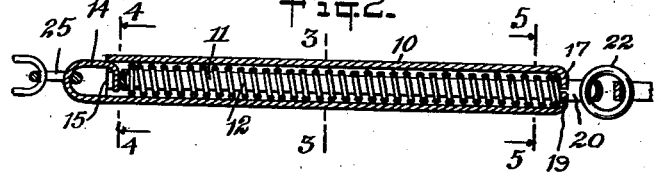
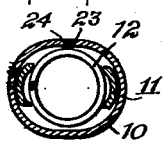 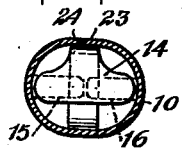 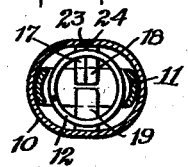
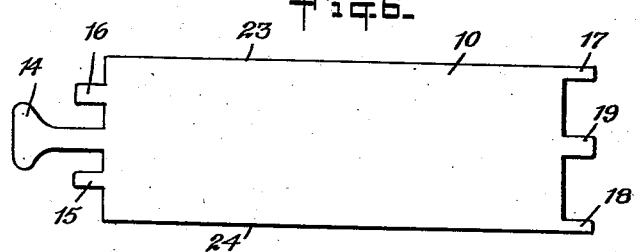
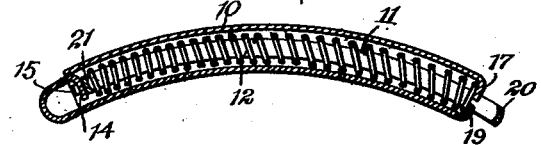
WITNESSES
INVENTOR
John J. Schoeninger
BY
ATTORNEYS Patented Sept. 19, 1944

2,358,739

UNITED STATES PATENT OFFICE 2,358,739

LINK

John J. Schoeninger, Forest Hills, N. Y.

Application March 19, 1943, Serial No. 479,709

3 Claims. (Cl. 59—79)

This invention relates to links and more particularly to an expansion link which may be used wherever a resilient member is needed to allow for temporary expansion.

An object of the invention is to provide a link of the character described which will have a minimum of parts and which is capable of being stamped out by automatic machinery and subsequently assembled to provide a strong durable link. A further object is to provide a link which may be made of relatively light weight material but which nevertheless will be strong enough to perform the functions for which it is manufactured.

In the accompanying drawing,

Figure 1 is a cross-sectional view showing the interior construction of my link.

Figure 2 is another cross-sectional view taken at right angles to the view shown in Figure 1.

Figure 3 is a cross-sectional view taken on the line 3—3 of Figure 2,

Figure 4 is a cross-sectional view taken on the line 4—4 of Figure 2.

Figure 5 is a cross-sectional view taken on the line 5—5 of Figure 2.

Figure 6 is a plan view of the blank from which the casing and supporting member is made.

Figure 7 is a view of the sliding member of the link.

Figure 8 is a cross-sectional view of a modification of my link adapted for use where a curved surface is desired, such as in a wrist watch or bracelet construction.

Referring more particularly to the drawing, my link consists of the cover member 10, a sliding member 11 and a spring 12. The cover member 10 is made with a T-shaped member 14 and two lugs 15 and 16 at one end. At the opposite end lug 19 and two half lugs 17 and 18 are provided.

As is shown in Figure 7 the sliding member comprises a piece of metal bent upon itself to form a closed end 20 and an open end 21. In assembling the link a loop 22 may be inserted upon the sliding member 11 and the spring 12 is then inserted within sliding member 11. A T-shaped member 14 is provided with a link 25 and is bent upon itself to form a loop. The cover is then rolled so that the edges 23 and 24 abut each other and the half lugs 17 and 18 form a single lug. The combined lug 17 and 18 and the lug 19 are then bent inwardly between the spring and the end 20 of the sliding member 11 to hold the spring within the cover. The lugs 15 and 16 are bent inwardly to engage the T-member 14 and to position it in place. It will be seen that the end 21 of the sliding member 11 will abut the inner side of the T member when the link is not under tension and move outwardly against the spring 12 when the link is extended. As shown in Figure 8 the entire link may be curved to suit any particular purpose. The link may be used either singly or as a plurality of links to form a chain and may be applied to innumerable uses.

I claim:

1. A link comprising a sliding member consisting of a piece of material bent upon itself to form a loop, a spring within said loop, a cover member with a T-shaped extension on one end of said cover member, said T-shaped extension bent upon itself to form a hook and lugs on said one end of the cover member engaging said T-shaped member and lugs on the other end of said cover member engaging said spring.

2. A link including a cover, a sliding member and a spring, said cover member being formed with a T-shaped member at one end thereof and having lugs at both ends thereof, said T-shaped member being bent upon itself to form a hook, and said lugs being bent inwardly to support the end of said T-shaped member and to engage said spring.

3. A link comprising a cover member, a spring and a sliding member, said cover member being provided with a T-shaped member at one end and lugs at either end, said T-shaped member being bent upon itself to form a loop, the lugs on the cover member at the end adjacent said T-shaped member being bent inwardly to engage the inner surface of said T-shaped member, said cover being rolled about said spring and sliding member to have the sliding member engage the outer end of said T-shaped member, and the lugs at the opposite end of said cover member being bent inwardly to engage said spring.

JOHN J. SCHOENINGER.